US012508812B2

(12) United States Patent
Wang et al.

(10) Patent No.: US 12,508,812 B2
(45) Date of Patent: Dec. 30, 2025

(54) SUPPLY MANIFOLD TRIGGER ARMS

(71) Applicant: Hewlett-Packard Development Company, L.P., Spring, TX (US)

(72) Inventors: Deyang Wang, Singapore (SG); Adnil San Dela Pena Sazon, Singapore (SG); Qian Tao, Singapore (SG)

(73) Assignee: Hewlett-Packard Development Company, L.P., Spring, TX (US)

(*) Notice: Subject to any disclaimer, the term of this patent is extended or adjusted under 35 U.S.C. 154(b) by 237 days.

(21) Appl. No.: 18/291,991

(22) PCT Filed: Jul. 30, 2021

(86) PCT No.: PCT/US2021/043843
§ 371 (c)(1),
(2) Date: Jan. 25, 2024

(87) PCT Pub. No.: WO2023/009134
PCT Pub. Date: Feb. 2, 2023

(65) Prior Publication Data
US 2024/0367438 A1 Nov. 7, 2024

(51) Int. Cl.
*B41J 2/175* (2006.01)
*B41J 25/00* (2006.01)
*B41J 29/70* (2006.01)

(52) U.S. Cl.
CPC ............ *B41J 2/175* (2013.01); *B41J 25/001* (2013.01); *B41J 29/70* (2013.01)

(58) Field of Classification Search
CPC ........ B41J 2/1721; B41J 2/175; B41J 19/005; B41J 25/001; B41J 25/34; B41J 29/02; B41J 29/70
See application file for complete search history.

(56) References Cited

U.S. PATENT DOCUMENTS

| | | | | |
|---|---|---|---|---|
| 4,222,673 | A | 9/1980 | Plaza et al. | |
| 5,469,201 | A * | 11/1995 | Erickson | B41J 2/17509 347/85 |
| 5,793,390 | A | 8/1998 | Claflin et al. | |
| 6,003,981 | A | 12/1999 | Cameron et al. | |
| 6,030,073 | A * | 2/2000 | Coiner | B41J 2/17509 347/85 |
| 10,071,578 | B2 * | 9/2018 | Sing | B41J 25/34 |

* cited by examiner

*Primary Examiner* — Anh T Vo
(74) *Attorney, Agent, or Firm* — Foley & Lardner LLP

(57) ABSTRACT

In some examples, the disclosure describes device that includes a moveable carriage, a supply manifold releasably coupled to the moveable carriage utilizing a locking mechanism, and a trigger arm coupled to the supply manifold to move the supply manifold a distance away from the moveable carriage while the locking mechanism is in an unlocked position.

15 Claims, 5 Drawing Sheets

SUPPLY MANIFOLD TRIGGER ARMS

BACKGROUND

A printing device can deposit a print substance on to print media to generate images on the print media. The print substance can be deposited by dispensers (e.g., inkjet pens, printing device pens, etc.) that can experience malfunctions. The dispensers can be provided with print substance through a supply manifold coupled to a plurality of printing substance reservoirs. The inkjet pens can be communicatively coupled to the printing device through electrical connections (e.g., connectors, etc.) to receive printing instructions for depositing the printing substance on a print medium.

DETAILED DESCRIPTION

Figure 1:
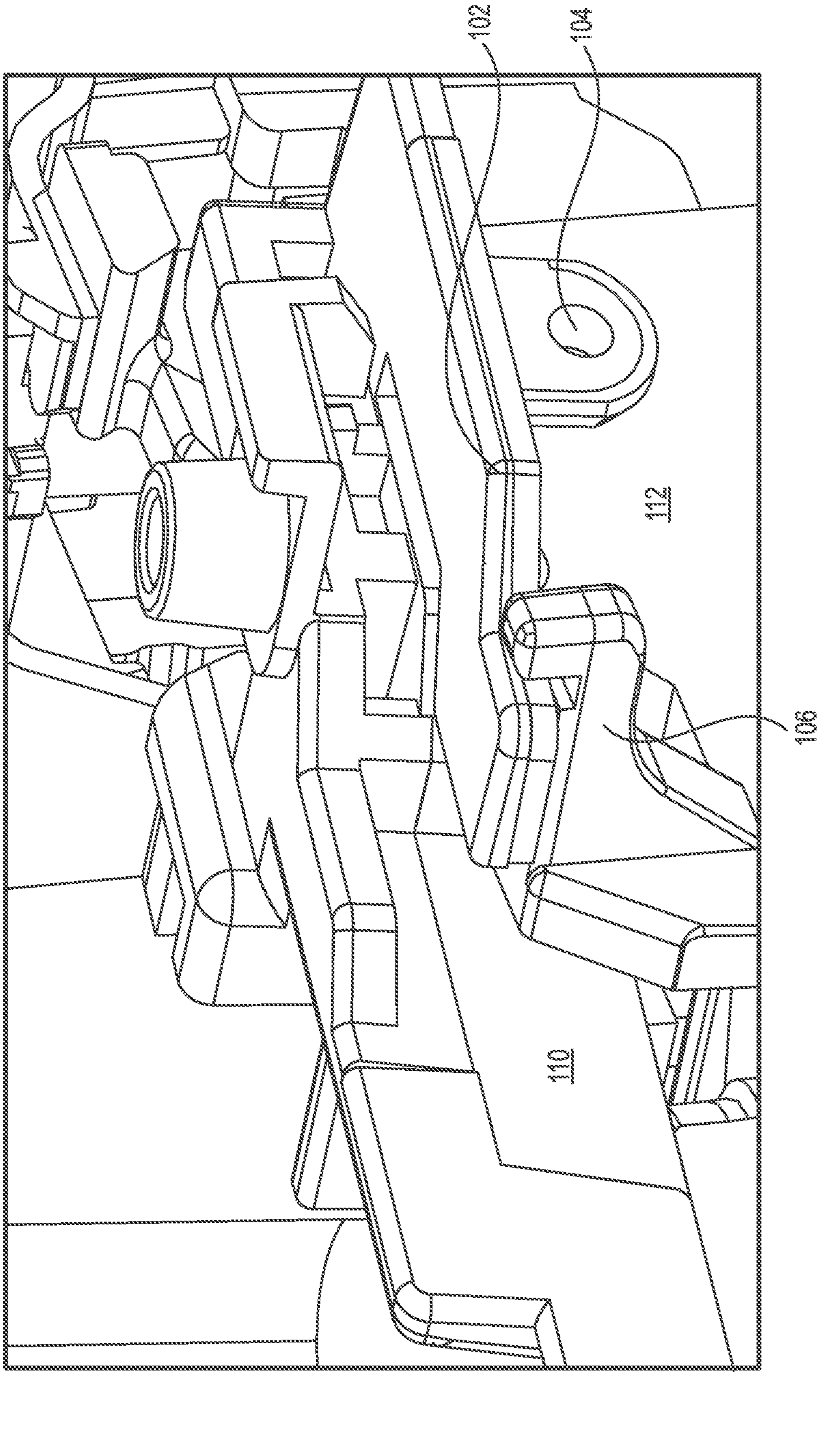
FIG. 1 illustrates an example trigger arm for a supply manifold coupled to a carriage device to enable depositing a print substance.

A printing device can receive digital data from a computing device to be utilized to generate physical representations of the digital data on a substrate. As used herein, a printing device includes a device that can deposit a print substance on to a substrate or print media to generate an image on the substrate. As used herein, a substrate can include a material that can receive a print substance to generate a permanent or semi-permanent image on the material. In some examples, the printing device can include an inkjet printing device that can deposit an ink substance on a substrate to generate an image on the substrate.

In some examples, the printing device can deposit the print substance through a plurality of dispense nozzles and/or a dispenser that includes a plurality of dispense nozzles. As used herein, a dispense nozzle can include a device or system that is used to dispense or propel droplets of a print substance on to a surface of a substrate or print medium. In some examples, the dispense nozzle can be a nozzle of an inkjet pen that can be positioned within a moveable carriage. As used herein, an inkjet pen includes a device to propel a print substance on to a substrate such as print media. In these examples, the moveable carriage can be utilized to move the inkjet pen to a particular location such that the inkjet pen can deposit a quantity of print substance on to the substrate.

In some examples, the moveable carriage can include or be coupled to a supply manifold that can provide the print substance to an inkjet pen from a print substance reservoir. As used herein, a print substance reservoir can be a container that can include a print substance to be utilized by the printing device. In some examples, the supply manifold can include a plurality of fluidic connections to provide a plurality of inkjet pens with print substance from a plurality of corresponding print substance reservoirs. In some examples, the supply manifold can be positioned on a top side of the inkjet pen. In some examples, the supply manifold can be utilized to secure the inkjet pen to a particular location within the moveable carriage. For example, the supply manifold can include a latching or locking mechanism to secure the supply manifold to the moveable carriage and include a locking mechanism to secure the inkjet pen in a particular position. In some examples, the locking mechanism can also secure an electrical connection of the inkjet pen to a corresponding electrical connection of the moveable carriage.

In some examples, when the supply manifold is not secure to the moveable carriage, the inkjet pen can be damaged when the moveable carriage moves from a first position to a second position. For example, the moveable carriage can move from a first position to a second position through the force of a track device (e.g., drive train, etc.). In this example, an inkjet pen positioned within the moveable carriage can be shifted (e.g., moved) when the supply manifold is not secured to the moveable carriage. In this example, connections between the inkjet pen and the moveable carriage can be damaged along with other components of the inkjet pen and/or moveable carriage. In these examples, the supply manifold may still be able to move under a physical barrier positioned above the supply manifold and carriage device (e.g., moveable carriage, etc.).

In some examples, the supply manifold can be raised from a first position (e.g., locked position, secured position, etc.) to a second position (e.g., maintenance position, etc.) that exposes the inkjet pens and other components within the carriage device. In these examples, the inkjet pens and other components can be removed to be maintained or replaced when the supply manifold is at the second position. In these examples, the second position can be a great enough distance away from the carriage device to allow components (e.g., inkjet pens, etc.) to be removed from the carriage device and also prevent the carriage device from moving since the supply manifold can interact with physical structures within the printing device that can prevent the carriage device from moving.

However, the supply manifold can be positioned between the first position and the second position when the supply manifold is not securely locked by a locking mechanism of the carriage device. In some examples, the supply manifold can pass by or under the physical structure that would prevent the carriage device from moving. In this way, the supply manifold may not be in the second position to allow access to the components within the carriage device, but may also not be in the first position that locks the supply manifold to the carriage device and secures the components in a fixed position within the carriage device. In this way, the carriage device is still capable of moving, which can shift the position of the components within the carriage device and damage the components within the carriage device. Thus, in order to prevent the carriage device from moving when the supply manifold is not secured or locked to the carriage device, a mechanism can be utilized to raise the supply manifold to a distance to ensure that the supply manifold will interact with a physical structure when the supply manifold is not secured to the carriage device.

The present disclosure relates to trigger arms for supply manifolds. As used herein, a trigger arm can include a device for raising the supply manifold a distance above the carriage device. In some examples, the trigger arm can include a mechanical mechanism for raising the supply manifold a distance such that the supply manifold interacts with a physical barrier at the same distance to prevent the carriage device from moving, which can damage components of the carriage device. In a specific example, the trigger arm can include a mechanical device for moving the supply manifold away from the surface of the moveable carriage when the supply manifold is not secured to the moveable carriage. In some examples, the trigger arm can raise the supply manifold a particular distance or beyond a distance threshold above the moveable carriage to prevent the moveable carriage from moving when the supply manifold is not secured to the moveable carriage. In this way, the moveable carriage can be prevented from moving, which can prevent damage to the inkjet pen, supply manifold, and/or moveable carriage when the moveable carriage attempts to move when the supply manifold is not secured to the moveable carriage.

FIG. 1 illustrates an example trigger arm 102 for a supply manifold 110 coupled to a carriage device 112 to enable depositing a print substance. As described herein, the supply manifold 110 can be utilized to provide or supply a print substance to an inkjet pen (e.g., dispenser, inkjet dispenser, print substance dispenser, etc.). In some examples, the supply manifold 110 can include a plurality of tubes to transport the print substance from a print substance reservoir or tank that includes a print substance to the inkjet pen within the carriage device 112. As described herein, the carriage device 112 can be a moveable carriage that can transport the inkjet pen from a first location to a second location and/or to a plurality of locations relative to a substrate to deposit the print substance on to the substrate (e.g., membrane, paper, etc.).

As described herein, the supply manifold 110 can be utilized to secure or lock the inkjet pen at a particular position within the carriage device 112. For example, the supply manifold 110 can be locked or secured to the carriage device 112 and correspondingly lock or secure the inkjet pen to a position to receive the print substance from the supply manifold 110. In addition, the inkjet pen can be secured at a position to allow electrical connections of the inkjet pen to connect with electrical connections of the carriage device 112. In this way, the inkjet pen can be secured within the carriage device 112 when the supply manifold 110 is secured to the carriage device 112.

However, the supply manifold 110 may not be properly locked or secured to the carriage device 112 when a locking mechanism is not coupled to the supply manifold 110. When this happens, the carriage device 112 may still be capable of moving, which can shift the inkjet pen within the carriage device 112 and damage the inkjet pen and/or electrical connections of the inkjet pen or carriage device 112. As described herein, the supply manifold 110 can be raised by a trigger arm 102 to a distance above the carriage device 112 such that the supply manifold 110 interacts with a physical structure (e.g., stopping mechanism, etc.) at the distance and prevent the carriage device 112 from moving. In this way, the trigger arm 102 can be utilized to prevent the movement of the carriage device 112 when the supply manifold is not secured or locked to the carriage device 112.

In some examples, the trigger arm 102 can be positioned on an exterior portion of the supply manifold 110. For example, the trigger arm 102 an extend from an edge of the supply manifold 110. In some examples, the trigger arm 102 can extend away from the supply manifold 110 a first distance and extend parallel to the edge of the supply manifold 110 a second distance. In this way, an "L" shape can be formed along the edge of the supply manifold 110. For example, the trigger arm 102 can extend away from the supply manifold 110 such that the trigger arm 102 can interact with a base 106 that extends from the carriage device 112. In some examples, the trigger arm 102 can interact with the base 106 separately from the supply manifold 110 interacting with the carriage device 112. Although an exterior trigger arm 102 is illustrated, the trigger arm 102 can be positioned within an interior portion of the supply manifold 110 such that the trigger arm 102 is positioned between the supply manifold 110 and the carriage device 112.

In some examples, the trigger arm 102 can apply a pressure on the supply manifold 110 to move the supply manifold 110 away from the carriage device 112. As described herein, the supply manifold 110 can interact with a physical structure within the printing device when the supply manifold 110 is at a particular distance away from the carriage device 112, but may not interact with the physical structure when the supply manifold is closer to the carriage device 112. In some examples, the trigger arm 102 can include a spring mechanism or be spring loaded to provide a rotational force around a pivot point 104. In some examples, the pivot point 104 can be a rotational point of the trigger arm 102 where the trigger arm 102 can rotate on the exterior portion of the carriage device 112. In this way, the trigger arm 102 can rotate along the pivot point 104 in a counter clockwise direction around the pivot point 104 to apply a force on the base 106 such that the force against the base 106 moves the supply manifold 110 in an upward direction or away from the surface of the carriage device 112. In some examples, the trigger arm 102 can be coupled to or interact with a hinge that couples the supply manifold 110 to the carriage device 112. In these examples, the trigger arm 102 can provide a rotational force on the hinge to move the supply manifold in an upward direction away from the carriage device 112.

As described further herein, the supply manifold 110 can be lifted to a specific distance (e.g., threshold distance, etc.) above the carriage device 112 through the force applied by the trigger arm 102. In some examples, the specific distance can correspond to a distance where the supply manifold will interact with a physical structure if the carriage device 112 attempts to move. In this way, the supply manifold 110 can interact with the physical structure at the specific distance and prevent the carriage device 112 from moving, which can damage components within the carriage device 112. In some examples, the supply manifold 110 can be secured to the carriage device 112 by a locking mechanism attached to the carriage device 112. In these examples, a force can be applied to the supply manifold 110 to overcome the force applied by the trigger arm 102 to allow the locking mechanism to secure the supply manifold 110 to the surface of the carriage device 112. In this way, if the locking mechanism does not fully secure the supply manifold 110 to the surface of the carriage device 112, the trigger arm 102 can force the supply manifold 110 to be raised a specific distance or beyond a threshold distance away from the carriage device 112.

As described further herein, the supply manifold 110 can be at a distance above the carriage device 112 to interact with a surface (e.g., stopping mechanism, structure, etc.) to prevent the carriage device 112 from moving from a particular area or location. In this way, the trigger arm 102 can be utilized to prevent the carriage device 112 from moving when the supply manifold 110 is not secured to the carriage device 112 by a locking mechanism.

Figure 2:
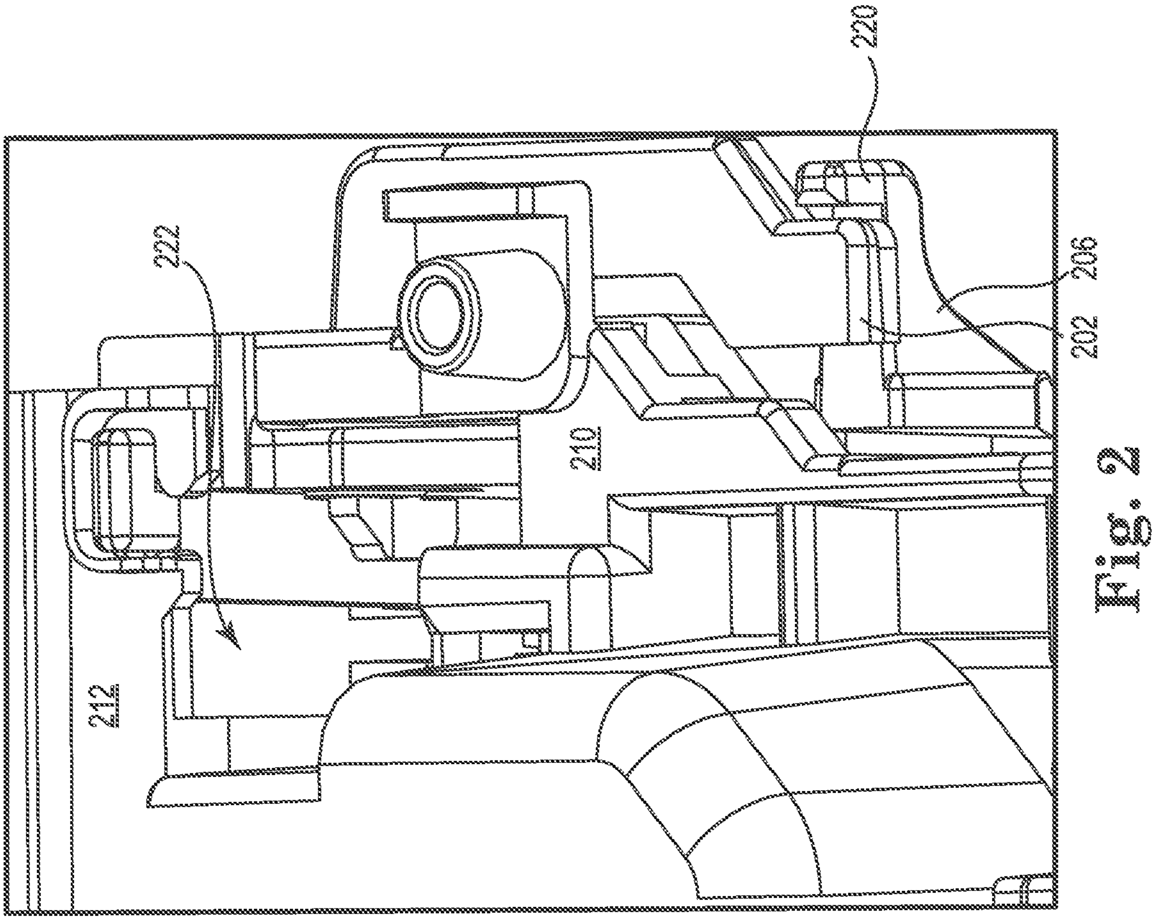
FIG. 2 illustrates an example trigger arm for a supply manifold coupled to a carriage device to enable depositing a print substance.

FIG. 2 illustrates an example trigger arm 202 for a supply manifold 210 coupled to a carriage device 212 to enable depositing a print substance. In some examples, the trigger arm 202 can be the same or similar device as trigger arm 102 as referenced in FIG. 1. For example, the trigger arm 202 can extend away from an edge of the supply manifold 210 (e.g., to the right of the page as illustrated in FIG. 2, etc.) and extend parallel to the edge of the supply manifold 210 (e.g., to the bottom of the page as illustrated in FIG. 2, etc.). In these examples, the trigger arm 202 can interact with a base 206 that can extend from the carriage device 212.

As described herein, the trigger arm 202 can include a spring mechanism that can apply force on the base 206 and move the supply manifold 210 away from a surface of the carriage device 212 when the supply manifold 210 is not secured to the carriage device 212 by a locking mechanism. In this way, the trigger arm 202 can be utilized to lift the supply manifold 210 to a particular distance above the surface of the carriage device 212. In some examples, the trigger arm 202 can provide the spring force of the spring mechanism on a hinge 222 to move the supply manifold 210 away from the surface of the carriage device 212.

In some examples, the trigger arm 202 can extend parallel to the hinge 222 that couples the supply manifold 210 to the carriage device 212. For example, the hinge 222 can extend along a first edge of the supply manifold 210 to couple the first edge of the supply manifold 210 to the carriage device 212. In this example, the trigger arm 202 can be positioned on a second edge of the supply manifold 210 and extend in a direction that is parallel with the hinge 222. In this way, the trigger arm 202 can lift a third edge that is opposite the first edge of the supply manifold 210 away from the surface of the carriage device 212 along the axis of the hinge 222. In these examples, the trigger arm 202 can raise the supply manifold 210 to an angle between the surface of the supply manifold 210 and the surface of the carriage device 212 at the hinge 222. In these examples, the third edge of the supply manifold 210 can be a threshold distance above a surface of the carriage device 212 based on the angle generated at the hinge 222.

In some examples, the base 206 can be in a fixed position to apply an opposing force on the trigger arm 202 to allow a spring mechanism associated with the trigger arm 202 to move the supply manifold 210. In some examples, the base 206 can include a lip portion 220. In some examples, the lip portion 220 can be utilized to prevent the trigger arm 202 from moving beyond the surface of the base 206 when pressure is applied to the supply manifold 210 and/or when the trigger arm 202 is applying pressure to the surface of the base 206. In this way, the lip portion 220 can ensure that the trigger arm 202 maintains contact with the surface of the base 206 and lifts the supply manifold 210 to a threshold distance above the carriage device 212 and/or to a threshold angle at the hinge 222.

Figure 3:
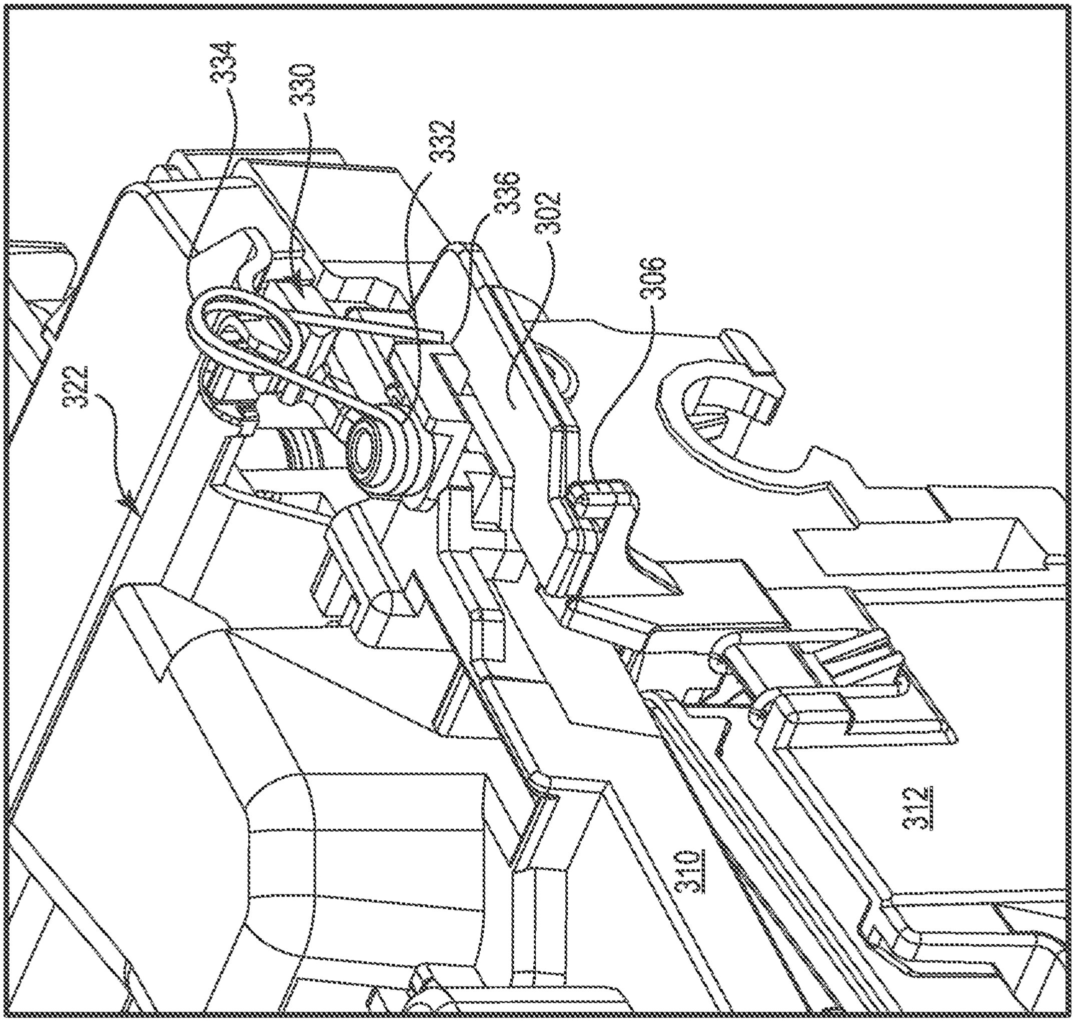
FIG. 3 illustrates a carriage device that includes a trigger arm for a supply manifold to enable depositing a print substance.

FIG. 3 illustrates a carriage device 312 that includes a trigger arm 302 for a supply manifold 310 to enable depositing a print substance. In some examples, the trigger arm 302 can be the same or similar device as trigger arm 202 as referenced in FIG. 2 and/or trigger arm 102 as referenced in FIG. 1. For example, the trigger arm 302 can extend away from an edge of the supply manifold 310 and extend parallel to the edge of the supply manifold 310. In these examples, the trigger arm 302 can interact with a base 306 that can extend from the carriage device 312.

As described herein, the trigger arm 302 can include a spring mechanism that can apply force on the base 306 and move the supply manifold 310 away from a surface of the carriage device 312 when the supply manifold 310 is not secured to the carriage device 312 by a locking mechanism. In this way, the trigger arm 302 can be utilized to lift the supply manifold 310 to a particular distance above the surface of the carriage device 312. In some examples, the trigger arm 302 can include an exterior spring mechanism 330 that can be coupled to an exterior portion of the trigger arm 302. In some examples, the supply manifold 310 can be relatively large and/or relatively heavy where an internal spring mechanism may not be capable of lifting the edge of the supply manifold 310 to the threshold distance above the carriage device 312.

In these examples, the external spring mechanism 330 can be utilized with an internal spring mechanism (e.g., spring mechanism to apply force on a pivot point of the trigger arm 302, etc.). In some examples, the external spring mechanism 330 can be utilized to replace an internal spring mechanism. In some examples, the spring mechanism 330 can apply a spring force on the trigger arm 302 such that the force applied on the base 306 lifts the supply manifold 310 to a threshold distance above the carriage device 312 and/or to a threshold angle at the hinge 322. In this way, the external spring mechanism 330 can be utilized to provide similar forces as described herein.

In some examples, the external spring mechanism 330 can include a first attachment point 332. In some examples, the first attachment point 332 can be a coiled attachment around a cylinder or protrusion of the trigger arm 302. As used herein, a coiled attachment can include an attachment where the spring mechanism 330 is wrapped around a surface of the cylinder or protrusion. In some examples, the external spring mechanism 330 can extend from the first attachment point 332 to a coil portion 334. As used herein, a coil portion, such as coil portion 334 can be a portion of a spring mechanism that is wrapped in a cylindrical or circular shape without an object positioned through the spring mechanism. For example, the coil portion 334 can include a wire material with spring properties that is wrapped in the shape of a circle, cylinder, and/or other shape with a void within the shape.

In some examples, the external spring mechanism 330 can extend from the coil portion 334 to a second attachment point 336. In some examples, the second attachment point 336 can be a straight attachment point that does not include a coil or wrapping of the external spring mechanism 330 around an object. In some examples, the second attachment point 336 can be coupled to a first surface of the trigger arm 302 (e.g., top surface, etc.) that is opposite to a second surface of the trigger arm 302 (e.g., bottom surface, etc.) that makes contact with the base 306. In these examples, the first attachment point 332 can be positioned in a direction that the supply manifold 310 is to move when the supply manifold 310 is not secured to the carriage device 312. For example, the first attachment point 332 can be positioned above the trigger arm 302 when the trigger arm 302 is to move the supply manifold 310 in a direction that is above the trigger arm 302.

Figure 4:
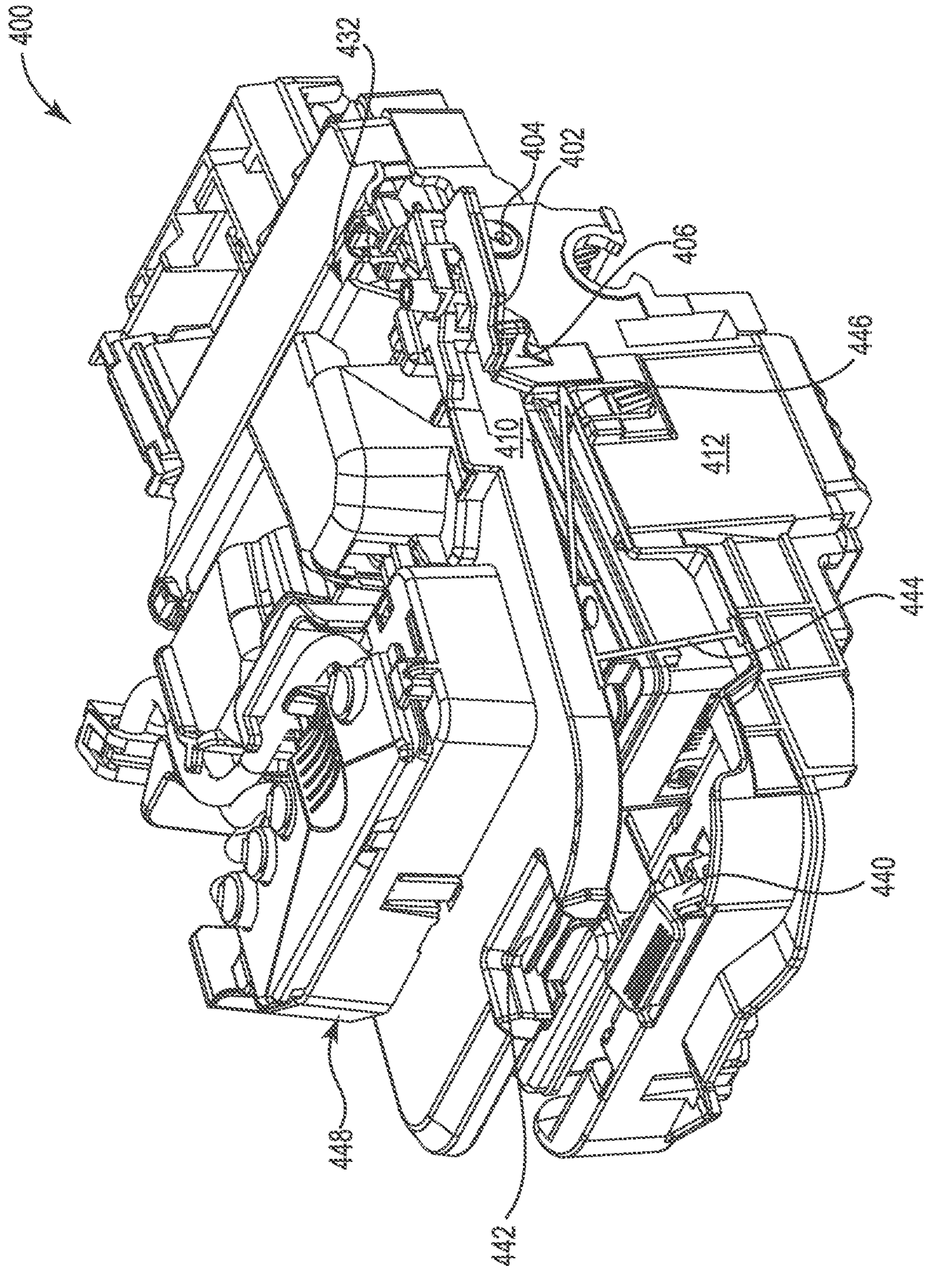
FIG. 4 illustrates a system that includes a carriage device with a trigger arm for a supply manifold to enable depositing a print substance.

FIG. 4 illustrates a system 400 that includes a carriage device 412 with a trigger arm 402 for a supply manifold 410 to enable depositing a print substance. As described herein, the system 400 can include a carriage device 412 that can include a supply manifold 410 positioned on a top surface of the carriage device 412 to provide print substance to a dispenser, such as an inkjet pen. In some examples, the supply manifold 410 can be altered by a trigger arm 402 interacting with a base 406. For example, the trigger arm 402 can include a spring mechanism to apply a force on the trigger arm 402 such that the trigger arm 402 applies pressure on the base 406 to raise the supply manifold 410 above a surface of the carriage device 412.

In some examples, trigger arm 402 can be the same or similar device as the trigger arm 302 as referenced in FIG. 3, the trigger arm 202 as referenced in FIG. 2, and/or the trigger arm 102 as referenced in FIG. 1. As described herein, the trigger arm 402 can include a pivot point 404 that can allow a spring mechanism to rotate the trigger arm 402 to allow the trigger arm to interact with the base 406 and alter a distance between the supply manifold 410 and the carriage device 412. For example, the trigger arm 402 can use the base 406 to apply leverage on the supply manifold 410 to raise the supply manifold 410 a distance 444 when the supply manifold 410 is not secured with a locking mechanism 440.

In some examples, the locking mechanism 440 can include a latch that can be coupled to the carriage device 412 and can include a mechanism to couple or secure to a corresponding receiving mechanism 442 that can allow the locking mechanism 440 to secure the supply manifold 410 to a surface of the carriage device 412. In some examples, the locking mechanism 440 can interact with the receiving mechanism 442 to prevent the trigger arm 402 from raising the supply manifold 410 to a distance 444 above the carriage device 412. In some examples, the locking mechanism 440 can prevent the supply manifold 410 from being moved by the trigger arm 402.

In this way, the supply manifold 410 can secure the dispenser, such as an inkjet pen in a position within the carriage device 412. As described herein, the inkjet pen can be secured by the supply manifold 410 to couple an electrical connection of the inkjet pen to an electrical connection of the carriage device 412. As described herein, the electrical connections can be damaged if the carriage device 412 moves when the supply manifold 410 is not secured by the locking mechanism 440 coupling the receiving mechanism 442. In some examples, the supply manifold 410 can include a plurality of fluidic connections with a corresponding plurality of inkjet pens within the carriage device 412. In some examples, a plurality of electrical connections, fluidic connections, and/or other types of hardware connections can be utilized to connect the supply manifold 410, inkjet pens, and/or carriage device 412 to allow the system 400 to enable the inkjet pens to deposit print substance on to a substrate.

In some examples, the trigger arm 402 can raise the supply manifold 410 to the distance 444 when the locking mechanism 440 is not coupled to the receiving mechanism 442. In other examples, the trigger arm 402 can raise the supply manifold 410 to an angle 446 such that a side or edge of the supply manifold 410 is raised to the distance 444. In these examples, the side or edge of the supply manifold 410 raised to the distance 444 can be opposite of a hinge 432 that couples the supply manifold 410 to the carriage device 412. In some examples, the hinge 432 can allow the supply manifold 410 to be raised above the carriage device 412 to allow a user to replace or perform maintenance on a dispenser, such as an inkjet pen.

In some examples, a printing device pen can include a first electrical contact to make a connection with a second electrical contact coupled to the carriage device 412. For example, the first electrical contact can be a plurality of contact pins that can correspond to contact pins of the second electrical contact. In some examples, the supply manifold 410 can secure the connection between the first electrical contact and the second electrical contact when the locking mechanism 440 is coupled to the receiving mechanism 442. In these examples, the first electrical contact is moveable relative to the second electrical contact while the supply manifold 410 is at a raised position or when the trigger arm lifts the supply manifold 410 above the surface of the carriage device 412. As described herein, the first electrical contact moving relative to the second electrical contact can damage the first electrical contact and/or the second electrical contact.

As described herein, the supply manifold 410 can include a manifold portion 448 that can be aligned with a plurality of dispensers, such as inkjet pens positioned within the carriage device 412 to provide a print substance to the plurality of dispensers. In some examples, the manifold portion 448 can be coupled to a plurality of corresponding print substance containers that include a print substance to be provided to the plurality of dispensers. In some examples, the manifold portion 448 can include an interior portion that can align the plurality of dispensers to corresponding electrical connections within the carriage device 412 to allow communication between the dispensers and a controller (e.g., computing device, etc.) of the printing device.

In some examples, the locking mechanism 440 can lock the supply manifold 410 in a first location (e.g., in contact with a surface of the carriage device, etc.). In these examples, the supply manifold 410 can maintain a position of a printing device pen (e.g., dispenser, inkjet pen, etc.) while the supply manifold 410 is in the first location or secured by the locking mechanism 440. As described herein, the supply manifold 410 can utilize the manifold portion 448 can allow the plurality of dispensers to be removed or maintained when the supply manifold 410 is lifted off the carriage device 412 or when the supply manifold 410 is not secured by the locking mechanism 440.

In these examples, the plurality of dispensers can be damaged when the supply manifold 410 is not secured by the locking mechanism 440 and the carriage device 412 attempts to move. In some examples, the trigger arm 402 can lift the supply manifold 410 to the threshold distance 444 and/or the threshold angle 446 to prevent the carriage device 412 from moving when the locking mechanism 440 does not secure the supply manifold 410. Preventing the carriage device 412 from moving when the supply manifold 410 is raised above the threshold distance 444 and/or to the threshold angle 446 is described in further detail in FIG. 5.

Figure 5:
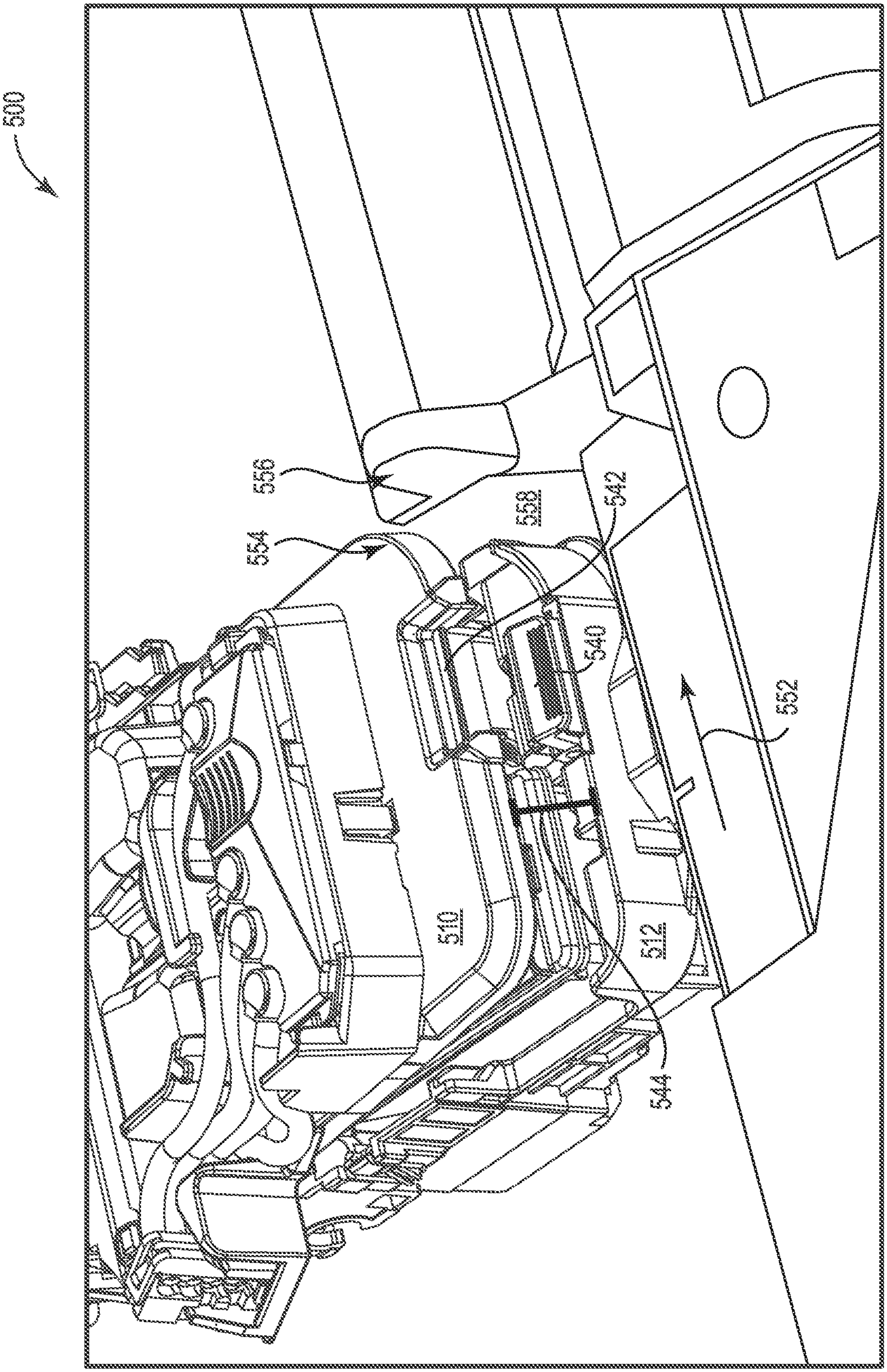
FIG. 5 illustrates a system that includes a carriage device with a trigger arm for a supply manifold to enable depositing a print substance.

FIG. 5 illustrates a system 500 that includes a carriage device 512 with a trigger arm for a supply manifold 510 to enable depositing a print substance. In some examples, the system 500 can include the same or similar elements as system 400 as referenced in FIG. 4. In some examples, a trigger arm as described herein can be utilized to move a supply manifold 510 a distance 544 above the carriage device 512. As described herein, the trigger arm can move the supply manifold 510 away from the surface of the carriage device 512 when the locking mechanism 540 is not coupled to the receiving mechanism 542 to secure the supply manifold 510 to a surface of the carriage device 512.

As described herein, the locking mechanism 540 can latch on to the receiving mechanism 542 to prevent the supply manifold 510 from moving in a different direction than the carriage device 512. For example, the locking mechanism 540 can be coupled to the receiving mechanism 542 to allow the supply manifold 510 to move with the carriage device 512 when the carriage device 512 moves to a plurality of different positions to deposit print substance. In this way, the supply manifold 510 can secure or prevent movement of components positioned between the carriage device 512 and the supply manifold 510 when the carriage device 512 moves from a first location to a second location. Thus, when the supply manifold 510 is not secured by the locking mechanism 540 interacting with the receiving mechanism 542, the components positioned between the carriage device 512 and the supply manifold can move or be damaged when the carriage device 512 moves from a first location to a second location.

In some examples, the distance 544 can be above or away from the surface of the carriage device 512 to allow a surface 554 of the supply manifold 510 to interact with a stopping mechanism 556. As used herein, a stopping mechanism 556 can refer to a ledge or physical structure that prevents the carriage device 512 from moving past the stopping mechanism 556. In some examples, the stopping mechanism 556 can include a space 558 below the stopping mechanism 556 to allow the carriage device 512 and supply manifold 510 to pass under the stopping mechanism 556 when the locking mechanism 540 is coupled to the receiving mechanism 542. In this way, the trigger arm can raise the supply manifold the distance 544 such that the surface 554 of the supply manifold 510 will interact with the stopping mechanism 556 whenever the locking mechanism 540 is not coupled to the receiving mechanism 542 and securing the supply manifold 510 to the surface of the carriage device 512.

In some examples, the carriage device 512 can be communicatively coupled to a controller (e.g., computing device, etc.). In some examples, the controller may be a processing resource that is coupled to a memory resource. As used herein, the controller or processing resource may be a central processing unit (CPU), a semiconductor-based microprocessor, and/or other hardware devices suitable for retrieval and execution of instructions stored in non-transitory computer readable medium (e.g., the memory resource). The controller may fetch, decode, and execute instructions. As an alternative or in addition to retrieving and executing instructions, the controller may include an electronic circuit that includes electronic components for performing the functionality of instructions. As used herein, the memory resource may also be referred to as a non-transitory computer readable medium, and may be a volatile memory (e.g., RAM, DRAM, SRAM, EPROM, EEPROM, etc.) and/or non-volatile memory (e.g., a HDD, a storage volume, data storage, etc.) Although the following descriptions refer to an individual processor or controller and an individual memory, the descriptions may also apply to a system with multiple processors and multiple memories. In such examples, the instructions may be distributed (e.g., stored) across multiple memories and the instructions may be executed by multiple processors.

For instance, the controller may include instructions stored in the memory resource and executable by the controller to send a notification in response to movement by the drive train of the carriage device 512 to move the carriage device 512 while the supply manifold 510 is at a different location. For example, the drive train of the carriage device 512 can include a mechanical device that moves the carriage device 512 to a plurality of different locations. In some examples, the drive train can move carriage device 512 in the direction of arrow 552. In some examples, a signal from a sensor coupled to the stopping mechanism 556 can be provided to the controller while the supply manifold 510 interacts with the stopping mechanism 556. That is, when contact is made between the surface 554 of the supply manifold 510 and the stopping mechanism 556, a sensor on the stopping mechanism 556 can send a signal to the controller to indicate that the carriage device 512 has been stopped by the stopping mechanism 556. In this way, the controller can determine that the supply manifold 510 is not secured to the surface of the carriage device 512 and that an error has occurred.

In this example, the surface 554 of the supply manifold 510 can make contact with the stopping mechanism 556 at the second location and the controller can send a notification to a user that the supply manifold 510 is not secured by the locking mechanism 540 being coupled to the receiving mechanism 542. In this way, an error that the supply manifold 510 is not secured to the surface of the carriage device 512 can be identified prior to components within the carriage device 512 being damaged by the movement of the carriage device 512.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" refers to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and method of the disclosure. Since many examples can be made without departing from the spirit and scope of the system and method of the disclosure, this specification merely sets forth some of the many possible example configurations and implementations.

What is claimed is:

1. A device, comprising:

a moveable carriage;

a supply manifold releasably coupled to the moveable carriage utilizing a locking mechanism; and a trigger arm coupled to the supply manifold to move the supply manifold a distance away from the moveable carriage while the locking mechanism is in an unlocked position.

2. The device of claim 1, wherein the trigger arm is to interact with a base coupled to the moveable carriage to move the supply manifold the distance.

3. The device of claim 2, wherein the trigger arm is coupled to a spring mechanism to provide a force on the base to move the supply manifold the distance.

4. The device of claim 1, the trigger arm is to move the supply manifold to an angle relative to a surface of the moveable carriage while the locking mechanism is in the unlocked position such that a surface of the supply manifold is above the moveable carriage the distance.

5. The device of claim 1, comprising a hinge to couple the supply manifold to the moveable carriage.

6. The device of claim 5, wherein the trigger arm is coupled parallel to the hinge to rotate the supply manifold about the hinge.

7. The device of claim 1, wherein the supply manifold connects a plurality of printing device pens coupled to the moveable carriage to a corresponding plurality of print substance reservoirs.

8. A carriage device, comprising:

a printing device pen that includes a first electrical contact to make a connection with a second electrical contact coupled to the carriage device;

a supply manifold coupled to the carriage device by a hinge;

a locking mechanism to lock the supply manifold in a first location, wherein the supply manifold maintains a position of the printing device pen while the supply manifold is in the first location; and a trigger arm coupled to the hinge to move the supply manifold to a second location utilizing the hinge.

9. The carriage device of claim 8, wherein the first electrical contact is moveable relative to the second electrical contact while the supply manifold is at the second location.

10. The carriage device of claim 8, wherein the supply manifold prevents the carriage device from moving by interacting with a stopping mechanism while the supply manifold is at the second location.

11. The carriage device of claim 10, wherein the supply manifold moves past the stopping mechanism while the supply manifold is at the first location.

12. A system, comprising:

a carriage moveable from a first location to a second location by a drive train;

a printing device pen positioned on the carriage to dispense a print substance at the second location;

a supply manifold coupled to a surface of the carriage by a hinge;

a locking mechanism to lock the supply manifold in a first position, wherein the supply manifold maintains a position of the printing device pen to maintain an electrical connection between the printing device pen and the carriage;

a trigger arm that includes a spring mechanism to move the supply manifold about the hinge to a second position away from the carriage; and a controller to send a notification in response to movement by the drive train to move the carriage while the supply manifold is at the second location.

13. The system of claim 12, wherein the locking mechanism prevents the trigger arm from moving the supply manifold from the first location to the second location.

14. The system of claim 12, wherein the trigger arm provides a force on the hinge to move the supply manifold to a threshold angle while the trigger arm interacts with a base coupled to the carriage.

15. The system of claim 12, wherein a surface of the supply manifold is to interact with a stopping mechanism while the supply manifold is at the second location and a signal is to be provided to the controller while the supply manifold interacts with the stopping mechanism.

* * * * *